United States Patent
Aoki et al.

(10) Patent No.: US 7,663,833 B2
(45) Date of Patent: Feb. 16, 2010

(54) CONTROLLER, STORAGE APPARATUS AND CONTROL METHOD

(75) Inventors: Takahiro Aoki, Kawasaki (JP); Shigenori Yanagi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/123,938

(22) Filed: May 20, 2008

(65) Prior Publication Data

US 2008/0291576 A1 Nov. 27, 2008

(30) Foreign Application Priority Data

May 24, 2007 (JP) .............................. 2007-138330

(51) Int. Cl.
G11B 21/02 (2006.01)
G11B 19/02 (2006.01)

(52) U.S. Cl. .......................................... 360/75; 360/69

(58) Field of Classification Search ....................... None
See application file for complete search history.

(56) References Cited

U.S. PATENT DOCUMENTS

| 7,042,663 | B2 | 5/2006 | Shimotono et al. | |
| 7,142,385 | B2 | 11/2006 | Shimotono et al. | |
| 7,369,345 | B1 * | 5/2008 | Li et al. | 360/75 |
| 2006/0044668 | A1 * | 3/2006 | Cho | 360/75 |
| 2009/0034114 | A1 * | 2/2009 | Kuroki et al. | 360/75 |
| 2009/0116139 | A1 * | 5/2009 | Jeansonne et al. | 360/75 |

FOREIGN PATENT DOCUMENTS

| JP | A 2002-208239 | 7/2002 |
| JP | A 2004-146036 | 5/2004 |
| JP | A 2005-190641 | 7/2005 |
| JP | 2007-115309 | 5/2007 |
| KR | 10-0630762 | 9/2006 |

* cited by examiner

Primary Examiner—Andrew L Sniezek
(74) Attorney, Agent, or Firm—Greer, Burns & Crain, Ltd.

(57) ABSTRACT

A controller controls movement of a head mounted in a storage apparatus based on a signal output from an acceleration sensor. A head movement control section which controls movement of the head to a target position on a storage medium and a head unload control section unloads the head to an unload position based on (1) the time at which a drop or initial impact is first detected based on a signal output from the acceleration sensor and (2) threshold information, which includes a first threshold representing a standard strength of the signal output from the acceleration sensor at the time of drop and a second threshold representing a standard strength of the signal output from the acceleration sensor at the time of initially receiving impact.

6 Claims, 9 Drawing Sheets

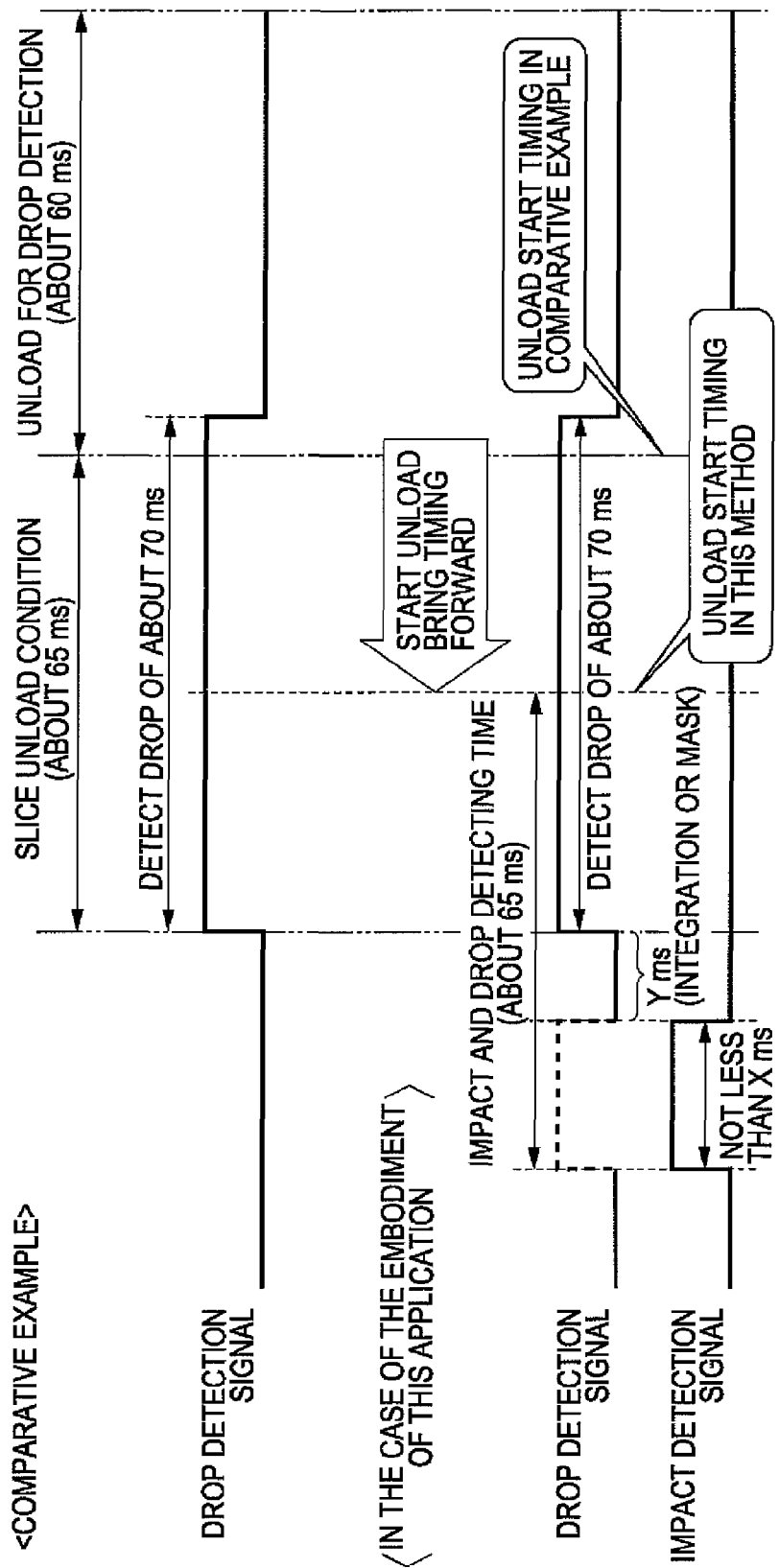

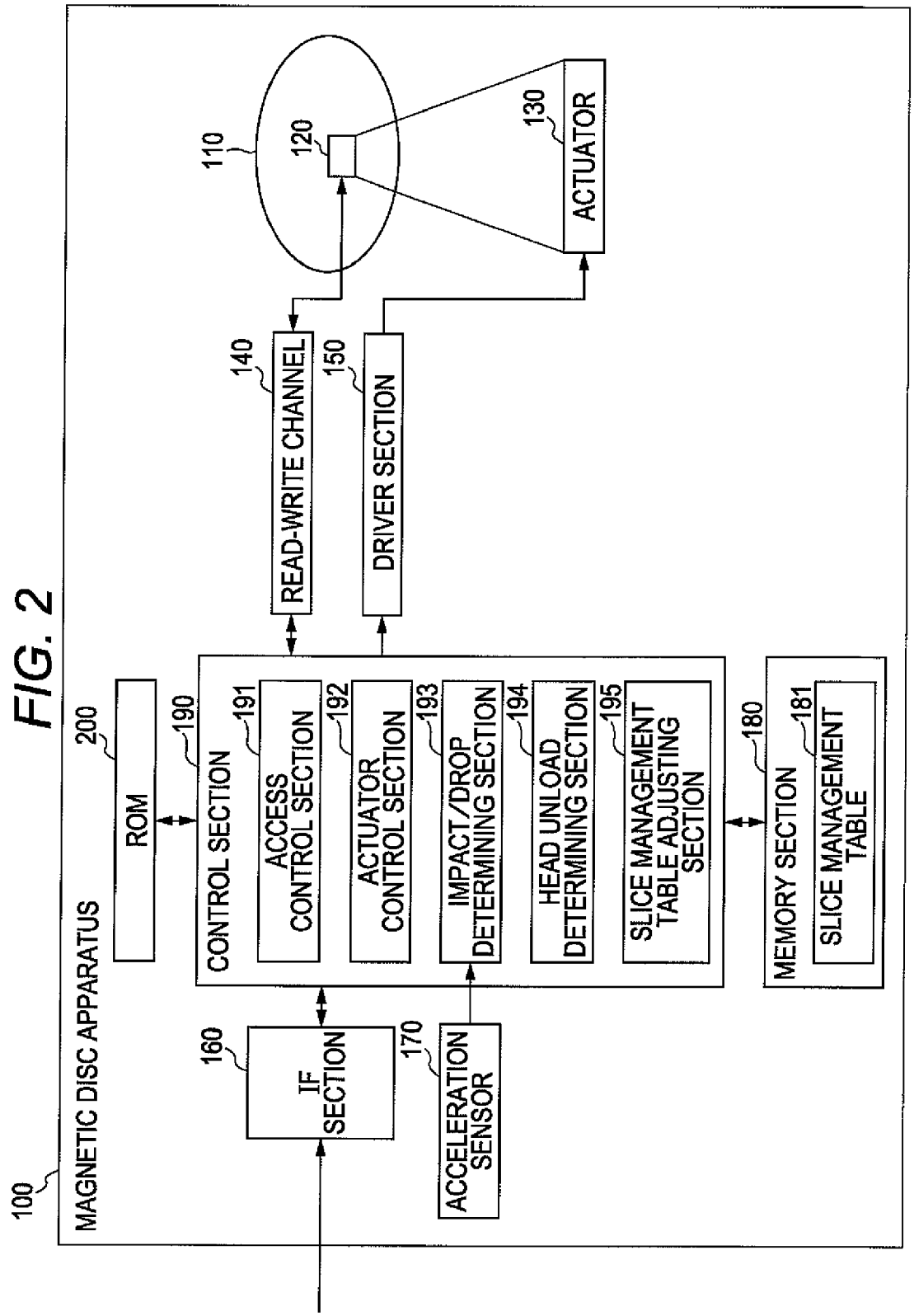

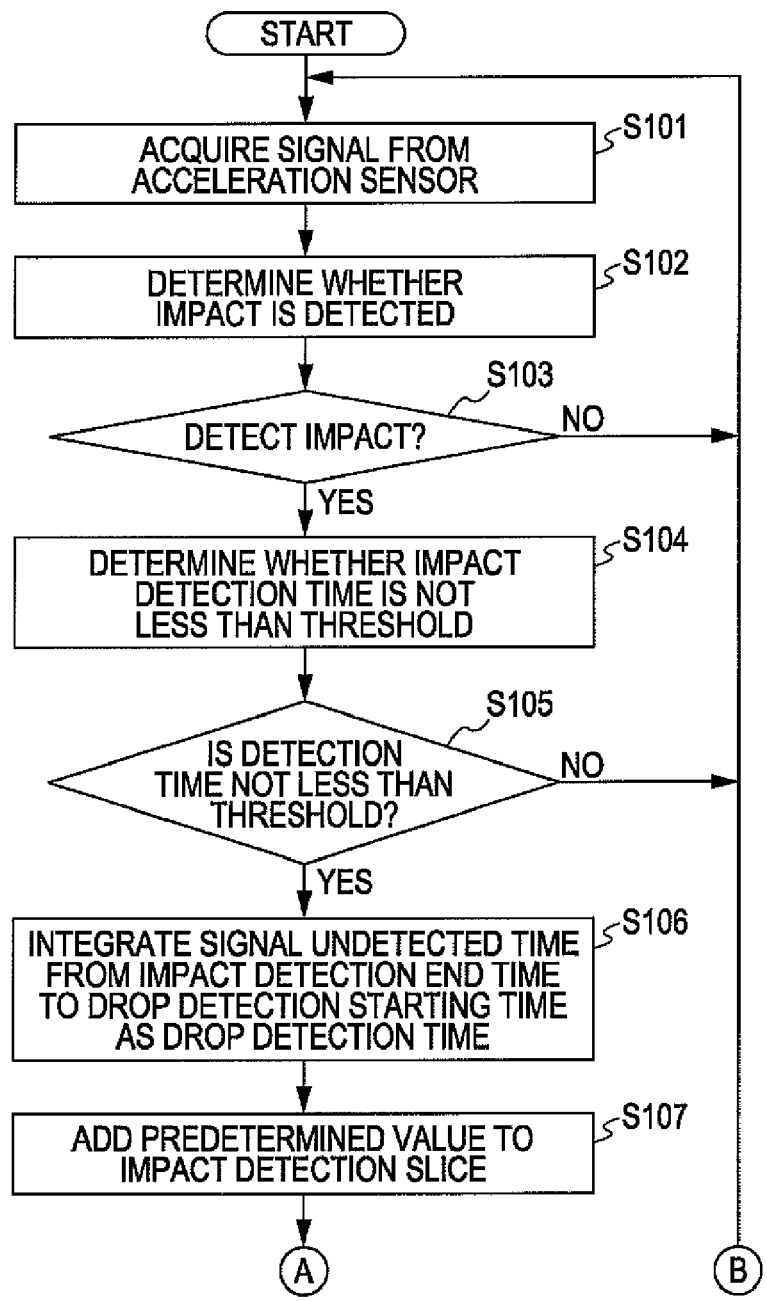

CONTROLLER, STORAGE APPARATUS AND CONTROL METHOD

BACKGROUND

1. Field

The present technique relates to a controller or the like which controls movement of a head mounted to a storage apparatus based on a signal output from an acceleration sensor.

2. Description of Related Art

In recent years, magnetic disc apparatuses are being miniaturized and light-weighted, and thus the magnetic disc apparatuses are mounted also to terminal devices (notebook computer or the like) which can be carried by users. However, since magnetic disc apparatuses are used for recording/reproducing data by means of moving of a head onto a rotating disc, they have a disadvantage in that they are weak against external impact. That is, when a magnetic disc apparatus receives impact or the like that causes a drop at the time of recording/reproducing data, its head comes in contact with a disc so that the disc is damaged. In the worst case, data recorded on the disc cannot be reproduced. The impact can happen, for example, if someone trips over the power cord, pulling the apparatus off of a table. In that example, the impact causes a drop to the floor, resulting in a second impact on the floor. This technique focuses on the first impact.

Therefore, in order to solve the problem that data recorded in a disc cannot be reproduced due to impact or the like resulting in a drop, conventionally a drop sensor is mounted in a magnetic disc device. In the case where a drop of a magnetic disc apparatus is detected (drop time exceeds a threshold), the head is unloaded from the disc. Such a head unload control is disclosed in, for example, Japanese Patent Application Laid-Open (JP-A) Nos. 2002-208239, 2004-146036 and 2005-190641.

However, in the above conventional technique, a head is unloaded from a disc based on the drop time starting from actual drop; therefore when a drop distance is short, a magnetic disc apparatus receives impact caused by the drop before a drop condition is satisfied. As a result, the head and the disc are damaged, and data stored in the disc cannot be protected.

SUMMARY

The present technique has been devised in view of the above problems, and its object is to provide a controller, a storage apparatus and a control method which are capable of unloading a head to an unload position regardless of a drop distance so as to prevent damages to a storage medium and a head and protecting data stored in a disc.

A controller for controlling movement of a head mounted to a storage apparatus based on a signal output from an acceleration sensor includes a head movement control section which controls movement of the head to a target position on a storage medium and a head unload control section. The head unload control section unloads the head to an unload position based on a point in time, at which drop or impact is first detected based on a signal output from the acceleration sensor and threshold information. The threshold information includes a first threshold representing a standard of strength of the signal output from the acceleration sensor at the time of receiving impact and a second threshold representing a standard of strength of the signal output from the acceleration sensor at the time of dropping.

BRIEF DESCRIPTION OF THE DRAWINGS

FIG. 1 is a diagram explaining an outline and a feature of a magnetic disc apparatus according to a first embodiment;

FIG. 2 is a functional block diagram illustrating a configuration of the magnetic disc apparatus according to the first embodiment;

FIG. 3 is a diagram illustrating one example of a data structure of a slice management table according to the first embodiment;

FIG. 4 is a flow chart (1) illustrating a process in the magnetic disc apparatus according to the first embodiment;

DETAILED DESCRIPTION OF THE EMBODIMENTS

Figure 5:
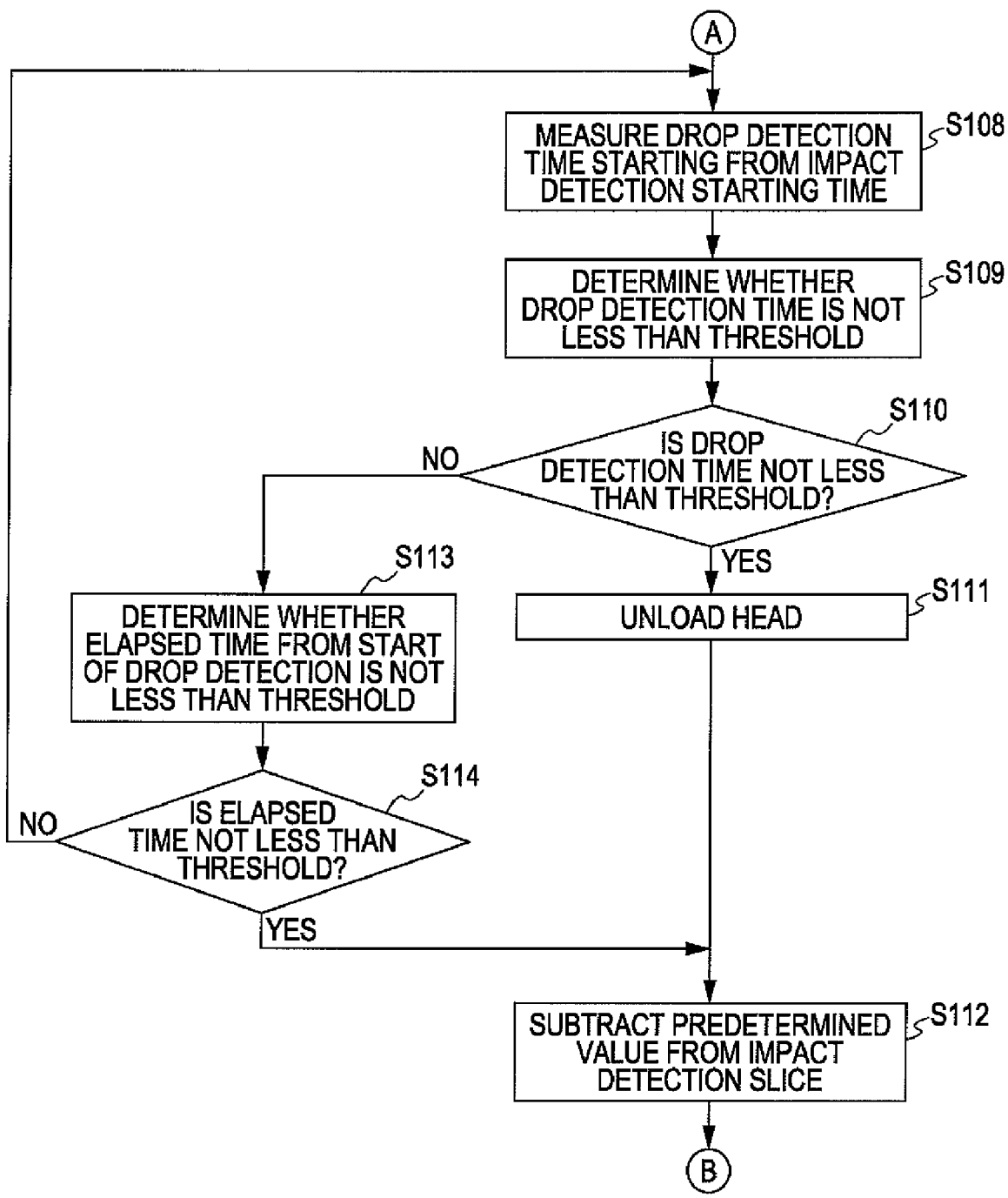
FIG. 5 is a flow chart (2) illustrating a process in the magnetic disc apparatus according to the first embodiment.

A controller, a storage apparatus and a control method according to the present technique will be described in detail below with reference to the drawings. The technique is not limited to the embodiments.

1. First Embodiment

An outline and a feature of a magnetic disc apparatus according to a first embodiment will be described in connection with a comparative example. FIG. 1 is a diagram explaining the outline and the feature of the magnetic disc apparatus according to the first embodiment.

In the conventional technique, as shown on an upper row of FIG. 1, a drop detection signal is acquired from a drop sensor, and time starting from the time point when the drop detection signal is "High" (the time point when the magnetic disc apparatus starts to drop) is monitored. When this time continues for a predetermined period, a head on a disc runs on a ramp mechanism so as to be unloaded. A magnetic disc apparatus of the comparative example is constituted so that theoretically, unloading can be completed before the apparatus drops freely and vertically from a height of 3 inches.

The magnetic disc apparatus of the comparative example might reach a ground surface before the theoretical drop time has elapsed (before the head is unloaded), when a drop distance is short. For this reason, the disc and the head can be damaged do to a delay of the head unloading, and data recorded on the disc cannot be protected.

In many cases, when a personal computer or the like slips down from a desk, it first moves in an oblique direction across the top of the desk. In this case, the sensor cannot detect the initial impact as a drop, so the unload operation is occasionally delayed. Therefore, a mechanism, which adds time for impact detection to the drop time as a predictor of the drop, so as to be capable of unloading the head as soon as possible, is required.

In the first embodiment, the time required for a 3-inch drop is about 125 ms (unload condition slice time of 65 ms+drop detection unload time of 60 ms). Unloading starts at the end of an unload condition slice of time, such as 65 ms. When more drop time is detected, the unload is carried out.

Concretely, in the first embodiment, initial impact is detected based on a signal output from the acceleration sensor. The signal has a predetermined amplitude for a predetermined period or slice of time. However, the signal caused by the initial impact might not be generated long enough to be recognized as a drop signal (for 65 ms, for example). Accordingly, when the impact detection time exceeds the predetermined impact slice time (xms), the time starting from the first impact detection time is regarded as start of the drop time. A determination is made whether the drop time is not less than a predetermined drop time or slice, and when the sensor output exceeds a threshold for an unload time, the head is moved to the unload position. Concretely, the head runs from the disc onto the ramp mechanism provided on an outermost periphery of the disc to the outside so as to be unloaded.

That is, the impact detection time before the drop is detected is added to the drop time, and the time immediately after the impact is detected (when the impact is no longer detected) (see FIG. 1) is also added to the drop time, so that the time required for drop detection can be put ahead, and thus the head can be unloaded earlier. For this reason, even when the drop distance is short, damage to the head and the disc at the time of the drop can be prevented, impossibility of head read/write can be prevented, and the data stored in the disc can be protected.

A configuration of the magnetic disc apparatus according to the first embodiment will be described below. FIG. 2 is a functional block diagram illustrating the configuration of the magnetic disc apparatus 100 according to the first embodiment. As shown in FIG. 2, the magnetic disc apparatus (hard disc drive (HDD)) 100 includes a disc 110, a head 120, an actuator 130, a read/write channel 140, a driver section 150, an IF section 160, an acceleration sensor 170, a memory section 180, a control section 190 and a ROM (Read Only Memory) 200.

The disc (magnetic disc) 110 is a disc-shaped storage medium where a magnetic thin film is formed on a substrate, and various data such as user data and control data are stored therein. The head 120 is a unit which records/reproduces data on/from the disc 110.

The actuator 130 is a unit which has a voice coil motor (VCM) and moves the head 120 by means of a control current output from the driver section 150. The read/write channel 140 acquires a servo signal, user data, etc. output from the head 120, so as to output the acquired servo signal and the user data to the control section 190.

The driver section 150 is a unit which outputs the control current to the actuator 130 in response to a control command from the control section 190 so as to control the movement of the head 120. The driver section 150 also outputs the control current to a spindle motor (not shown) to control rotation of the disc 110.

The IF section 160 is a unit which carries out data communication with a higher-level apparatus (not shown) using a predetermined communication protocol. The acceleration sensor 170 is a unit (sensor) which detects an acceleration, and outputs a signal as a detected result to the control section 190. Such a signal includes information about whether an acceleration has been detected and information about the level of an acceleration.

The memory section 180 is a memory unit (storage unit) which stores data and programs necessary for various processes in the control section 190, and has a slice management table 181 which is, in particular, closely related with the present technique as shown in FIG. 2.

The slice management table 181 stores a drop detection slice level which represents the threshold level of signals output from the acceleration sensor 170 that indicate that a drop has occurred, and an impact detection slice level which represents the threshold level of signals output from the acceleration sensor 170 that indicate that an impact has occurred.

FIG. 3 is a diagram illustrating one example of a data structure of the slice management table 181 according to the first embodiment.

As shown in FIG. 3, the slice management table 181 has a drop detection slice and an impact detection slice. In an example shown in FIG. 3, the drop detection slice is 0.4 (G), and the impact detection slice is 2.5 (G). That is, when the level (absolute value) of a signal output from the acceleration sensor 170 is less than 0.4 (G), this means that the magnetic disc apparatus 100 is dropping. When the level (absolute value) of a signal output from the acceleration sensor 170 is not less than 2.5 (G), this means that the magnetic disc apparatus 100 is receiving impact.

The control section 190 is a control unit having an internal memory for storing programs and control data which define various processing procedures, so as to execute various processes according to the programs and the control data. The control section 190 has an access control section 191, an actuator control section 192, an impact drop determining section 193, a head unload determining section 194, and a slice management table adjusting section 195 which are, in particular, closely related to the present technique as shown in FIG. 2.

Among these, the access control section 191 is a unit which controls recording/reproducing of data. For example, when the access control section 191 acquires data to be recorded from a higher-level apparatus, it outputs the acquired data to the read/write channel 140, so as to record the data on the disc 110. The access control section 191 acquires data to be requested from the read/write channel 140 in response to the data request from the higher-level apparatus, and outputs the acquired data to the higher-level apparatus.

The actuator control section 192 is a unit which outputs an output command relating to a control current to the driver section 150 when data is recorded or reproduced on/from the disc 110. When the driver section 150 acquires the output command from the actuator control section 192, it outputs the control current to the actuator 130 so as to control the head 120.

The impact drop determining section 193 is a unit which compares a level of a signal acquired from the acceleration sensor 170 with the slice management table 181, and determines whether the magnetic disc apparatus 100 is dropping or whether the magnetic disc apparatus is receiving an impact. The impact/drop determining section 193 outputs the determination result to the head unload determining section 194. In the following description, the state that the magnetic disc apparatus 100 is dropping is a drop state, and the state that the magnetic disc apparatus 100 is receiving an initial impact is an impact receiving state, and a state other than the drop state and the impact receiving state is a stationary state.

The head unload determining section 194 is a unit which acquires the determination result from the impact drop determining section 193, and determines whether the head 120 should be unloaded from the disc 110 based on time in the impact receiving state and time in the drop state. When the head unload determining section 194 determines that the head 120 should be unloaded, it outputs a control command to the driver section 150 so as to unload the head 120.

The process performed by the head unload determining section 194 will now be described. The head unload determining section 194 acquires the determination result from the impact drop determining section 193, and when the magnetic disc apparatus 100 is found to be in the impact receiving state, it counts the duration time of the impact receiving state. When the duration time of the impact receiving state is not less than the predetermined time (xms), the head unload determining section 194 counts the drop time starting from the detection of the impact.

That is, the state of the magnetic disc apparatus 100 is changed into the impact receiving state, the stationary state and the drop state in this order and when the impact receiving state continues for not less than the predetermined time, the head unload determining section 194 does not begin timing from the time at the actual drop of the magnetic disc apparatus 100 but begins timing from the time of the first detection of impact as the drop time (see FIG. 1). When the time counted as the drop time continues for not less than the predetermined time, the head unload determining section 194 determines that the head 120 should be unloaded.

The head unload determining section 194 acquires the determination result from the impact drop determining section 193, and when the magnetic disc apparatus 100 is found to be in the drop state (in the drop state before impact on the ground or the like), the head unload determining section 193 count the drop time from the start of the drop of the magnetic disc apparatus 100. When the measured time is not less than the predetermined time, it determines that the head 120 should be unloaded.

The slice management table adjusting section 195 is a unit which adjusts the slice management table 181. Specifically, the slice management table adjusting section 195 acquires the determination result from the impact drop determining section 193, and when the impact detection time is not less than the predetermined time (xms), the slice management table adjusting section 195 temporarily adds a predetermined value to the impact detection slice of the slice management table 181 (the impact detection slice is set to a maximum value, so that the impact/drop determining section 193 is temporarily prevented from determining that the magnetic disc apparatus 100 is in the impact receiving state).

When the head 120 is unloaded or after a predetermined time elapses after the predetermined value is added to the impact detection slice of the slice management table 181, the slice management table adjusting section 195 subtracts a predetermined value from the impact detection slice of the slice management table 181 (returns the value of the impact detection slice to an original value).

Such adjustment of the slice management table 181 by the slice management table adjusting section 195 can avoid a situation such that the impact receiving time shows a predetermined or more value and while the drop time starting from the first detection of the impact is being measured, the impact is again detected, thereby interrupting the measurement of the drop time.

The ROM 200 is a memory unit (storage unit) which stores data and program necessary for various processes by means of the control section 190.

The processing procedure of the magnetic disc apparatus 100 according to the first embodiment will be described below. FIGS. 4 and 5 are flow charts illustrating the process of the magnetic disc apparatus 100 according to the first embodiment. As shown in FIGS. 4 and 5, the magnetic disc apparatus 100 acquires a signal from the acceleration sensor 170 (step S101), and determines whether the impact/drop determining section 193 determines initial impact (step S102). When impact is not detected (No at step S103), the process goes to step S101.

On the other hand, when initial impact is detected (Yes at step S103), the head unload determining section 194 determines whether the impact detection time is not less than a threshold (step S104). When the impact detection time is less than the threshold (No at step S105), the process goes to step S101. When the impact detection time exceeds the threshold (Yes at step S105), the head unload determining section 194 integrates signal undetected time from the impact detection end time to the drop detection start time and counts it as part of the drop detection time (step S106).

The slice management table adjusting section 195 adds a predetermined value to the impact detection slice of the slice management table 181 (step S107), and the head unload determining section 194 counts the drop detection time starting from the initial impact detection time (step 8108) so as to determine whether the drop detection time is not less than a threshold (step S109).

When the drop detection time is not less than the threshold (Yes at step S110), the head unload determining section 194 unloads the head 120 (step S111). The slice management table adjusting section 195 subtracts the predetermined value from the impact detection slice (step S112), and the process goes to step S101.

On the other hand, when the drop detection time is less than the threshold (No at step S110), the head unload determining section 194 determines whether the elapsed time from the start of the drop detection is not less than a threshold (step S113). When the elapsed time is not less than the threshold (Yes at step S114), the process goes to step S112, and when the elapsed time is less than the threshold (No at step S114), the process goes to step S108.

Since the head unload determining section 194 counts the drop detection time starting from the time point of the first impact receiving state and determines whether the head 120 should be unloaded, the head can be unloaded before the magnetic disc apparatus 100 drops onto the ground.

In the magnetic disc apparatus 100 according to the first embodiment, initial impact based on a signal output from the acceleration sensor 170 is detected, and when the impact detection time continues for not less than the predetermined time (xms), the drop time starting from the first impact detection is detected. The determination is made whether the drop time is not less than the predetermined time, and when the drop time exceeds the predetermined time, the head 120 is unloaded from the disc 110 (unloaded to the unload position). For this reason, even when a drop distance is short, the head 120 can be prevented from colliding with the disc 110 and being damaged, thereby preventing the impossibility of head reading/writing.

2. Second Embodiment

Figure 6:
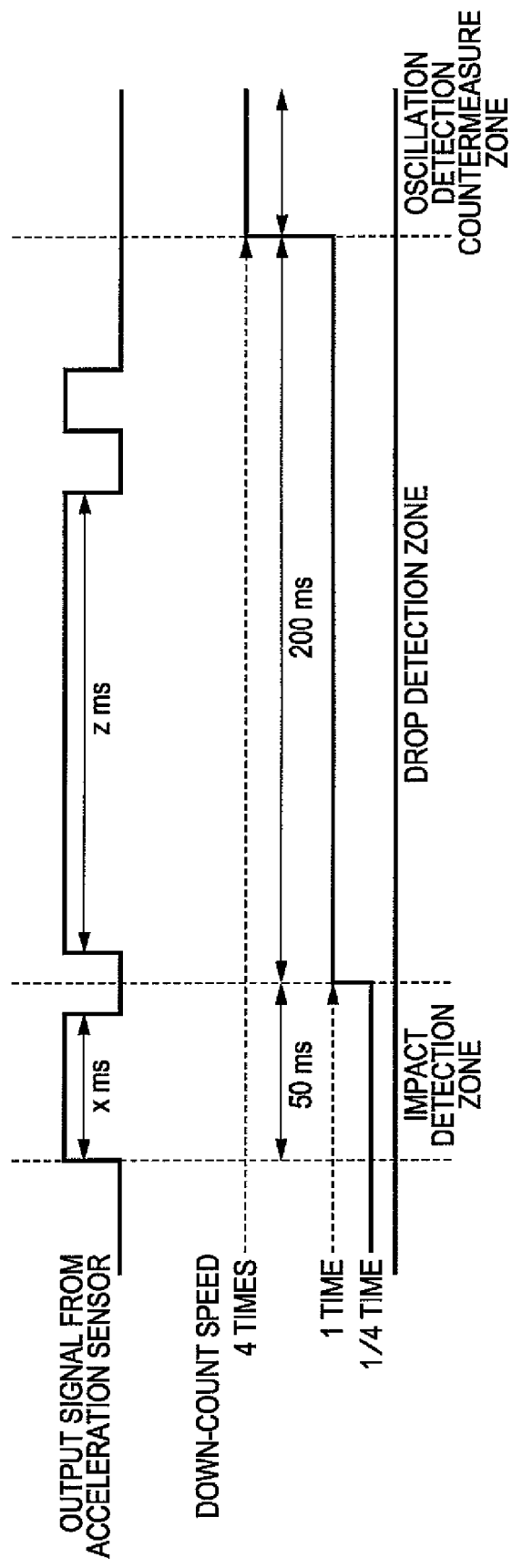
FIG. 6 is a diagram explaining an outline and a feature of a magnetic disc apparatus according to a second embodiment.

An outline and a feature of a magnetic disc apparatus according to a second embodiment will be described below. FIG. 6 is a diagram explaining the outline and the feature of the magnetic disc apparatus according to the second embodiment. The magnetic disc apparatus according to the second embodiment refers to a signal output from the acceleration sensor based on a down-count speed (specific time interval), and when the signal is "High" (the magnetic disc apparatus is dropping or receiving impact), a predetermined value is added to a count value. When the signal is "Low" (the magnetic disc apparatus is not dropping or receiving impact), a predetermined value is subtracted from the count value.

The magnetic disc apparatus adds/subtracts a predetermined value to/from the count value according to the down-count speed. For this reason, if the down-count speed is made faster, the timing at which the predetermined value is added/subtracted to/from the count value is further quickened, and if the down-count speed is reduced, the timing at which the predetermined value is added/subtracted to/from the count value becomes slower.

When the count value is not less than the threshold, the magnetic disc apparatus unloads the head from the disc. In the magnetic disc apparatus according to this embodiment, the detecting state of the sensor is divided into three zones: an impact detection zone; a drop detection zone; and an oscillation detection countermeasure zone as shown in FIG. 6, and changes a down-count speed (counting time interval) in each zone.

In the example shown in FIG. 6, a zone from the time at which the signal output from the acceleration sensor is firstly "High" to less than 50 ms is the impact detection zone. A zone from not less than 50 ms to less than 200 ms is the drop detection zone, and a zone of not less than 200 ms is the oscillation detection countermeasure zone. The down-count speed in the impact detection zone is ¼ time of a standard value, the down-count speed in the drop detection zone is one time of the standard time, and the down-count speed in the oscillation detection countermeasure zone is four times the standard value.

In the magnetic disc apparatus according to the second embodiment, the sensor detection state is divided into a plurality of zones, and a predetermined value is added/subtracted to/from the count value according to the down-count speed corresponding to each zone. For this reason, the head can be unloaded earlier, and data recorded on the disc can be protected.

In the magnetic disc apparatus according to the second embodiment, a discrimination does not have to be made whether the apparatus is dropping or receiving impact based on a signal output from the acceleration sensor. For this reason, the cost of the magnetic disc apparatus can be reduced.

Figure 7:
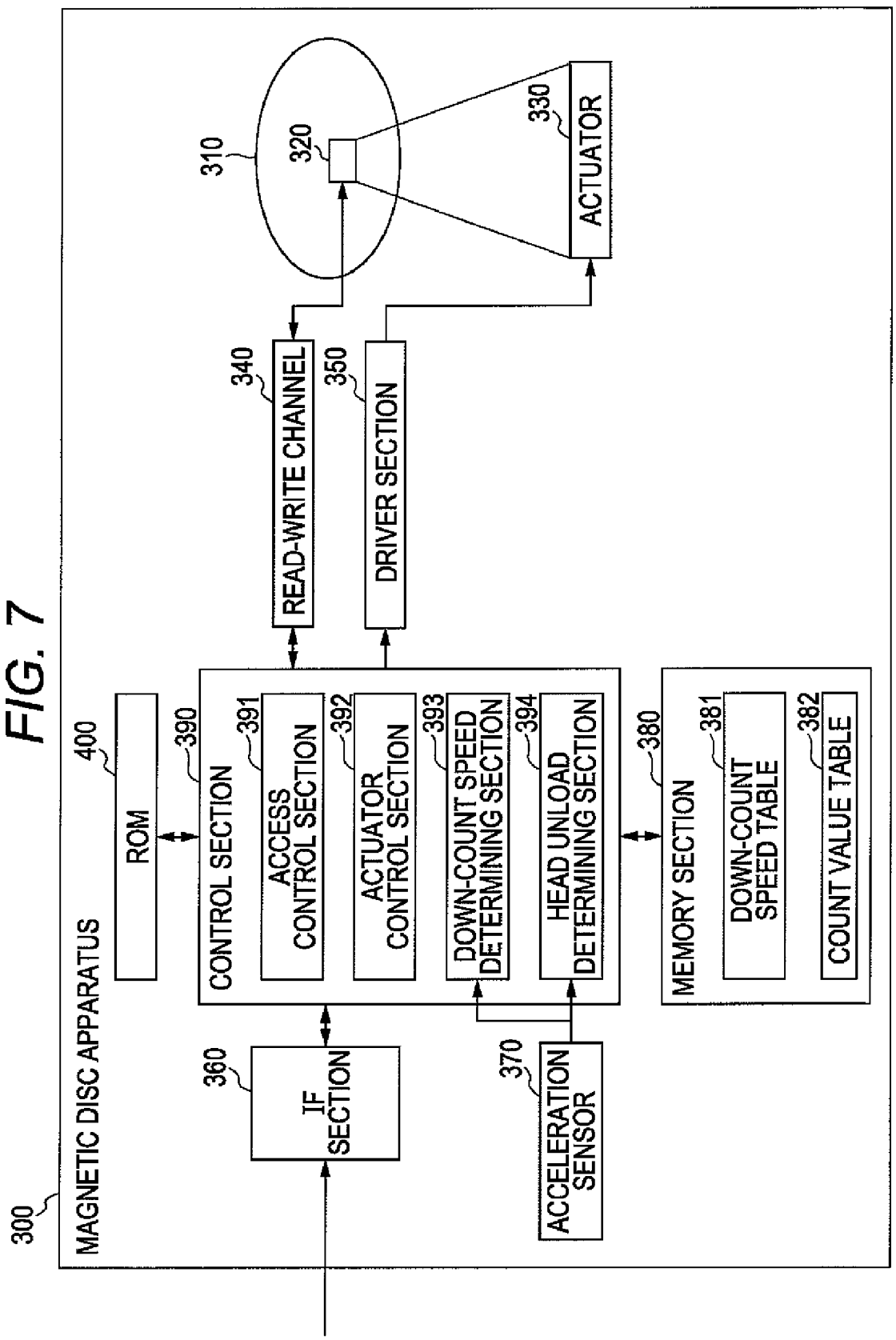
FIG. 7 is a functional block diagram illustrating a configuration of the magnetic disc apparatus according to the second embodiment.

A configuration of the magnetic disc apparatus according to the second embodiment will be described below. FIG. 7 is a functional block diagram showing the configuration of the magnetic disc apparatus 300 according to the second embodiment. As shown in FIG. 7, the magnetic disc apparatus 300 includes a disc 310, a head 320, an actuator 330, a read/write channel 340, a driver section 350, an IF section 360, an acceleration sensor 370, a memory section 380, a control section 390 and a ROM (Read Only Memory) 400.

Since the description about the disc 310, the head 320, the actuator 330, the read/write channel 340, the driver section 350, the IF section 360 and the acceleration sensor 370 is similar to the description about the disc 110, the head 120, the actuator 130, the read/write channel 140, the driver section 150, the IF section 160 and the acceleration sensor 170, the description is not repeated here.

The memory section 380 is a memory unit (storage unit) which stores data and programs necessary for various processes by means of the control section 390, and has a down-count speed table 381 and a count value table 382 which are closely related with the present technique, in particular, as shown in FIG. 7.

The down-count speed table 381 stores a standard value of the down-count speed and a current down-count speed.

Figure 8:
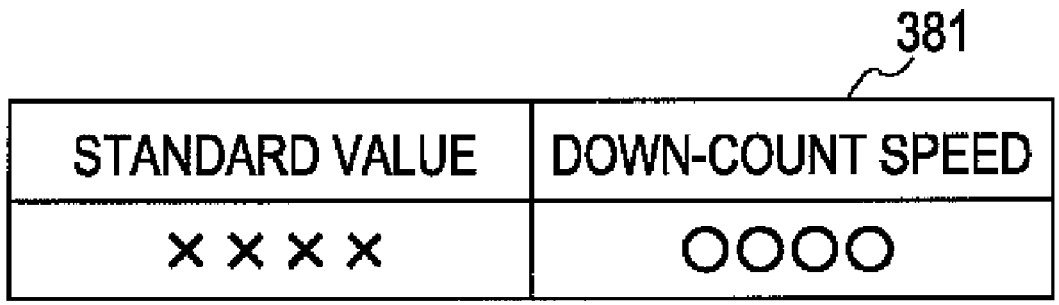
FIG. 8 is a diagram illustrating one example of a data structure of a down-count speed table.

FIG. 8 is a diagram illustrating one example of a data structure of the down-count speed table 381. For example, when the head detection state is in the impact detection zone, the down-count speed becomes ¼ time of the standard value, and becomes the standard value in the drop detection zone. In the oscillation detection countermeasure zone, the down-count speed becomes four-times the standard speed.

Figure 9:
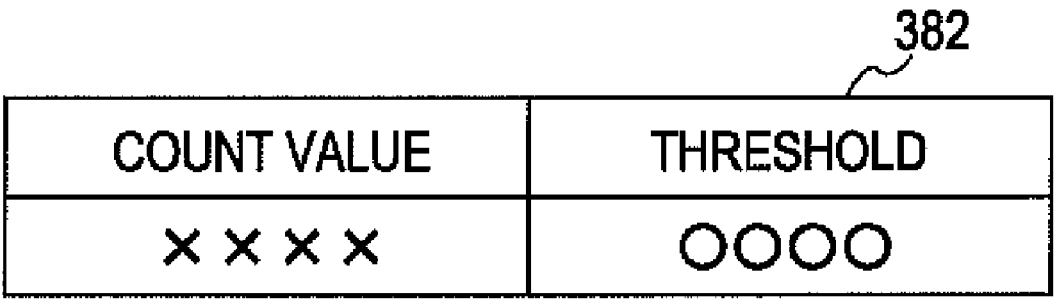
FIG. 9 is a diagram illustrating one example of a data structure of a count value table.

The count value table 382 stores the count values and a threshold. FIG. 9 is a diagram illustrating one example of a data structure of the count value table 382. When the count value in FIG. 9 becomes not less than the threshold, the magnetic disc apparatus 300 unloads the head 320.

With reference to FIG. 7, the control section 390 is a control unit which has an internal memory for storing programs and control data for defining various processes, so as to execute the various processes according to them. As shown in FIG. 7, the control section 390 has an access control section 391, an actuator control section 392, a down-count speed determining section 393 and a head unload determining section 394 which are, in particular, closely related to the present technique.

Since the description about the access control section 391 and the actuator control section 392 is similar to the description about the access control section 191 and the actuator control section 192 described in the first embodiment, the description is not repeated here.

The down-count speed determining section 393 is a unit which determines the head detection state based on a signal output from the acceleration sensor 370 and sets the down-count speed based on the determination result.

Specifically, the down-count speed determining section 393 determines a zone from the time point at which the acceleration sensor 370 is first "High" to less than 50 ms as the impact detection zone, and sets the down-count speed stored in the count value table 382 to ¼ time of the standard value.

The down-count speed determining section 393 determines a zone of from not less than 50 ms to less than 200 ms as the drop detection zone based on the time point at which the acceleration sensor 370 is first "High", and sets the down-count speed stored in the count value table 382 to the standard value.

Further, the down-count speed determining section 393 determines an interval of not less than 200 ms as the oscillation detection countermeasure zone based on the time point at which the acceleration sensor 370 is first "High", and sets the down-count speed stored in the count value table 382 four times of the standard value.

The head unload determining section 394 is a unit which determines whether the head 320 should be unloaded. Specifically, the head unload determining section 394 determines whether the signal output from the acceleration sensor 370 is "High" or "Low" according to the down-count speeds stored in the down-count speed table 381. When the signal is "High", the head unload determining section 394 adds a predetermined value to the count value of the count value table 382 (this addition or combination is described as integration in FIG. 1; this is applied also to the following description), and when the signal is "Low", it subtracts a predetermined value from the count value.

As the down-count speed is increased, the time interval in which the head unload determining section 394 adds or subtracts a predetermined value to/from the count value becomes shorter. That is, the time interval is successively shorter in the impact detection zone, the drop detection zone and the oscillation detection countermeasure zone.

The head unload determining section 394 compares the count value of the count value table 382 with a threshold. When the count value is not less than the threshold, the head unload determining section 394 outputs the control command to the driver section 350 so as to unload the head 320 from the disc 310.

The ROM 400 is a memory unit (storage unit) which stores data and programs necessary for various processes in the control section 390.

Figure 10:
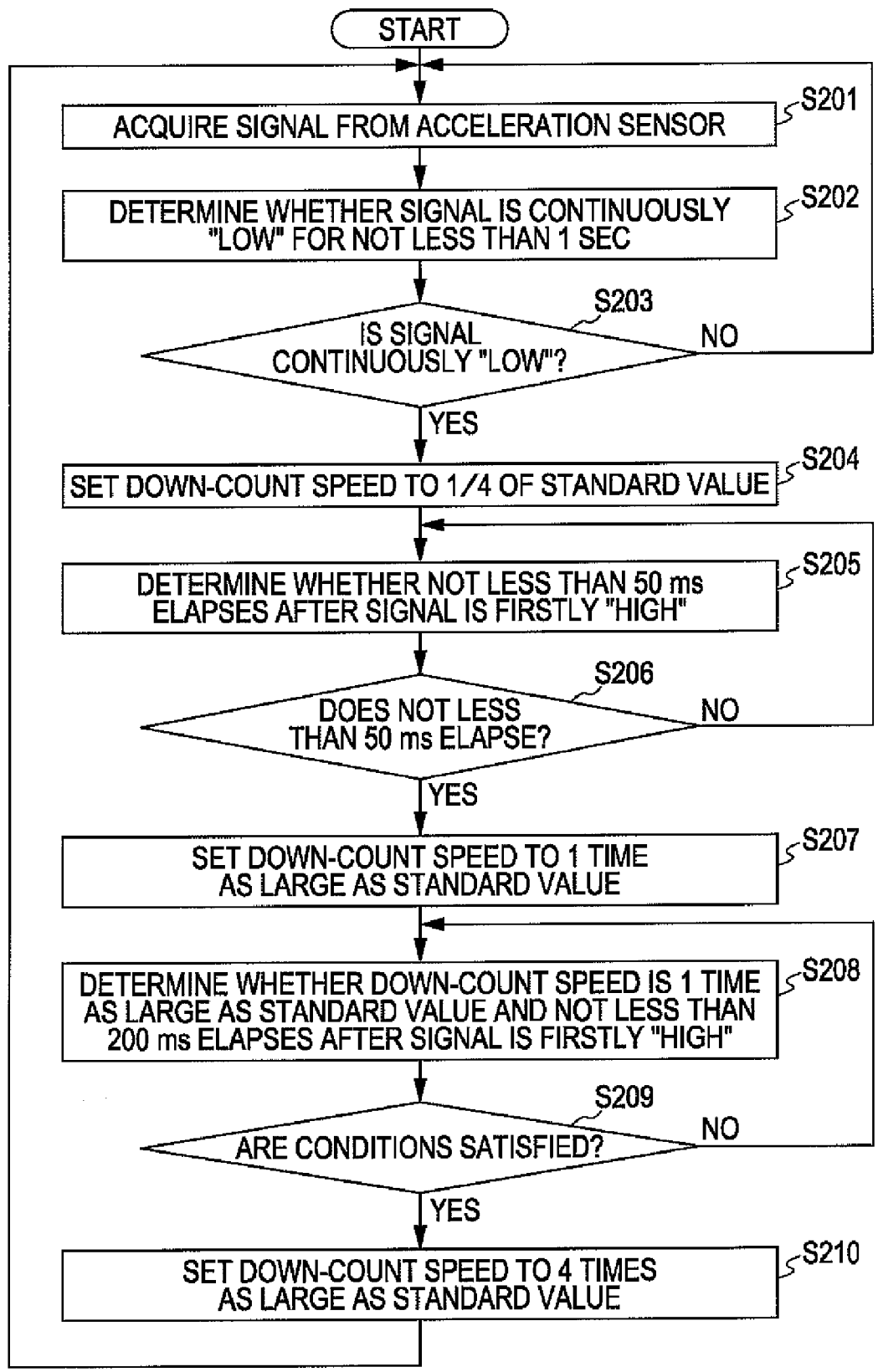
FIG. 10 is a flow chart illustrating a processing procedure of a down-count speed determining section.

A processing procedure in the down-count speed determining section 393 will be described below. FIG. 10 is a flow chart illustrating the processing procedure of the down-count speed determining section 393. As shown in FIG. 10, the down-count speed determining section 393 acquires a signal from the acceleration sensor 370 (step S201), and determines whether the signal continues to be "Low" for 1 or more seconds (step S202).

When the signal from the acceleration sensor 370 is not "Low" continuously for 1 or more seconds (No at step S203), the process goes to step S201. On the other hand, when the signal from the acceleration sensor 370 is "Low" continuously for 1 or more seconds (Yes at step S203), the down-count speed determining section 393 sets the down-count speed ¼ time of the standard value (step S204).

The down-count speed determining section 393 determines whether 50 ms or more elapses after the signal becomes "High" (step S2005). When 50 ms or more does not elapse (No at step S206), the process goes to step S205, and when 50 ms or more elapses (Yes at step S206), the down-count speed determining section 393 sets the down-count speed at the standard value (step S207).

The down-count speed determining section 393 determines whether the down-count speed is at (one time of) the standard value and whether 200 ms or more elapses after the signal is first became "High" (step S208). When the conditions are not satisfied (No at step S209), the process goes to step S208. On the other hand, when the conditions are satisfied (Yes at step S209), the down-count speed determining section 393 sets the down-count speed at four times of the standard value (step S210), and the process goes to step S201.

Figure 11:
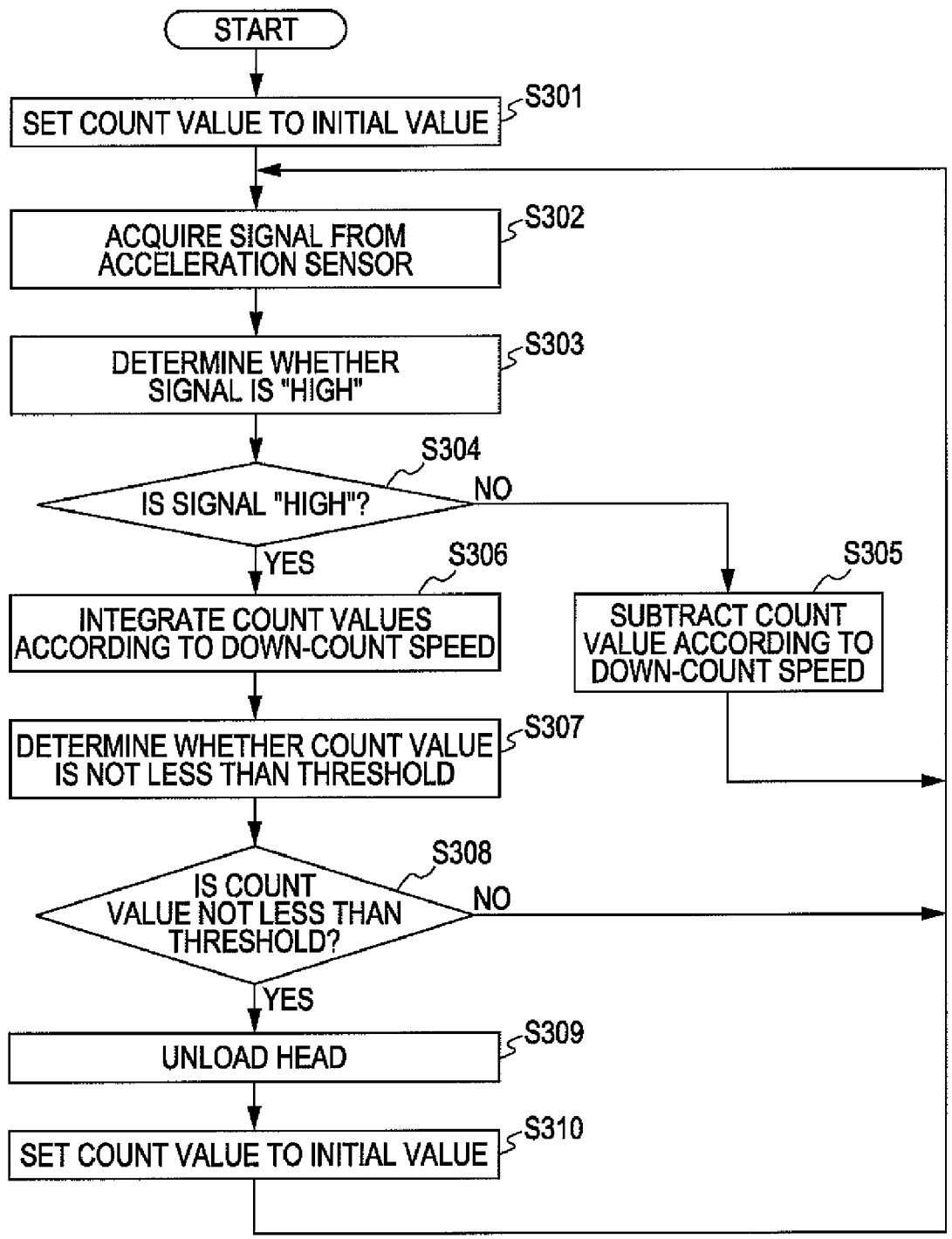
FIG. 11 is a flow chart illustrating a processing procedure of a head unload determining section.

A processing procedure of the head unload determining section 394 will be described below. FIG. 11 is a flow chart illustrating the processing procedure of the head unload determining section 394. As shown in FIG. 11, the head unload determining section 394 sets the count value to an initial value (step S301), and acquires a signal from the acceleration sensor 370 (step 9302).

The head unload determining section 394 determines whether the signal is "High" (step S303). When the signal is "Low" (No at step S304), the head unload determining section 394 reduces the count value according to the down-count speed (step S305), and the process goes to step S302.

On the other hand, if the signal is "High" (Yes at step S304), the head unload determining section 394 integrates (i.e., adds) the count value according to the down-count speed (step S306), and determines whether the count value is not less than the threshold (step S307).

When the count value is less than the threshold (No at step S308), the process goes to step S302. On the other hand, when the count value is not less than the threshold (Yes at step S308), the head unload determining section 394 unloads the head 320 (step S309), and sets the count value to the initial value (step S310), and the process goes to step S302.

In the magnetic disc apparatus 300 according to the second embodiment, the down-count speed determining section 393 determines the sensor detection state and sets the down-count speed, and the head unload determining section 394 adds/subtracts the predetermined value to/from the count value according to the down-count speed and determines whether the head 320 should be unloaded. For this reason, the head 320 can be unloaded earlier, and the data recorded on the disc 310 can be protected.

In the magnetic disc apparatus 300 according to the second embodiment, since the head detection state is detected so that the down-count speed is set, the head is prevented from being improperly unloaded, and reduction in the performance of the magnetic disc apparatus 300 can be prevented. For example, since the down-count speed in the impact detection zone is ¼ of the standard value, the count value can be prevented from being not less than the drop threshold in the impact detection zone.

In the second embodiment, as one example, the down-count speed in the impact detection zone is set to ¼ time of the standard value, and the down-count speed in the oscillation detection countermeasure zone is set to four times the standard value, but the down-count speed is not limited thereto. The down-count speed in the impact detection zone may be set to 1/N time of the standard value, and the down-count speed in the oscillation detection countermeasure zone may be N times of the standard value (N: integer of not less than 1).

Similarly as one example of the second embodiment, a zone of up to 50 ms after the signal of the acceleration sensor becomes "High" is the impact detection zone. A zone of from not less than 50 ms to less than 200 ms is the drop detection zone, and a zone of from not less than 200 ms is the oscillation detection countermeasure zone. However, these zones are not limited thereto. A zone of up to A ms after the signal of the acceleration sensor becomes "High" may be the impact detection zone, a zone of from not less than A ms to less than B ms may be the drop detection zone, and a zone of not less than B ms may be the oscillation detection countermeasure zone (A, B and C are integers of not less than 1, and A<B<C).

The various processes described in the above embodiment can be realized by executing previously prepared programs using the storage apparatus (computer). In the example shown in FIG. 2, various programs which realize the various processes are stored in the ROM 200, and the control section 190 reads and executes the various programs recorded in the ROM 200. As a result, the various processes which realize the functions of the various processing sections (the access control section 191, the actuator control section 192, the impact drop determining section 193 and the head unload determining section 194) are actuated.

In the example shown in FIG. 7, the various programs which realize the various processes are stored in the ROM 400, and the control section 390 reads and executes the various programs stored in the ROM 400. As a result, the various processes which realize the functions of the processing sections (the access control section 391, the actuator control section 392, the down-count speed determining section 393, and the head unload determining section 394) are actuated.

The various programs do not always have to be stored in the ROM 200 or 400 in advance. For example, the various programs may be stored in a "portable physical medium" such as a flexible disc (FD), a CD-ROM, a DVD disc, a magneto-optical disc and an IC card which is inserted into the computer, or "another computer (or server)" which is connected to the computer via a public line, Internet, LAN or WAN so that the computer reads the various programs therefrom so as to execute the program.

This technique can be applied not only to the magnetic disc apparatus but also to storage apparatuses such as an optical disc apparatus having an optical head and magneto-optical or paramagnetic disc apparatus having an optical head or a magnetic head. According to the applications of the apparatus and head, the ramp mechanism in the embodiments is not used, but a region other than a data recording region on a disc may be used as the unload position.

The above describes the embodiment of the present technique, but this technique may be embodied in various examples within a scope of the technical idea described in claims other than the above embodiments.

The information about the processing procedures, the control procedures, the concrete names, various data and parameters, which are described in the specification and the drawings, may be arbitrarily changed unless otherwise noted.

The respective components of the apparatuses shown in the drawings do not always have to be composed physically as shown in the drawings. That is, the concrete forms of dispersion and integration in the apparatuses are not limited to those shown in the drawings, and all or some of them can be dispersed/integrated functionally or physically in any unit according to various loads and the usage so as to be constituted.

According to the present technique, a first threshold which represents the strength of a signal output from the acceleration sensor that indicates a drop and a second threshold which represents the strength of a signal output from the acceleration sensor in the case of receiving initial impact are stored as threshold information. The head is unloaded to the unload position based on the time starting from the time point at which drop or initial impact is first detected based on the signals output from the acceleration sensor and the threshold information. With this configuration, the head can be suitably unloaded regardless of a drop distance, and the head and the storage medium are prevented from being damaged, and the data stored in the storage medium can be protected. When such a device is applied to the storage apparatus, reliability of the storage apparatus can be improved.

The controller, the storage apparatus and the control method of the present technique are useful for, for example, a storage apparatus which is built in a portable terminal device, and particularly, they are suitable for a case where the data stored in the disc should be protected even if the terminal device drops.

What is claimed is:

1. A controller for controlling movement of a head mounted in a storage apparatus based on a signal output from an acceleration sensor, comprising:
   a head movement control section which controls movement of the head to a target position on a storage medium;
   a head unload control section which unloads the head to an unload position based on (1) time starting from a time point at which an initial drop or impact is first detected based on a signal output from the acceleration sensor, and (2) threshold information, which includes a first threshold representing a strength of the signal output from the acceleration sensor at the time of drop and a second threshold representing strength of the signal output from the acceleration sensor at the time of receiving initial impact,
   wherein the head unload control section includes:
      a determining section which determines whether the strength of the signal is not less than the second threshold for not less than a predetermined period; and
      a head unload section which unloads the head to the unload position based on drop detection time and the time starting from a time point at which the strength of the signal is first not less than the second threshold based on the determination result, and
   a threshold adjusting section which, when the determining section determines that the strength of the signal is not less than the second threshold for not less than the predetermined period, adds a predetermined value to the second threshold, and when the head unload section unloads the head, subtracts a predetermined value from the second threshold.

2. A controller for controlling movement of a head mounted in a storage apparatus based on a signal output from an acceleration sensor, comprising:
   a head movement control section which controls movement of the head to a target position on a storage medium;
   a head unload control section which unloads the head to an unload position based on (1) time starting from a time point at which an initial drop or impact is first detected based on a signal output from the acceleration sensor, and (2) threshold information, which includes a first threshold representing a strength of the signal output from the acceleration sensor at the time of drop and a second threshold representing strength of the signal output from the acceleration sensor at the time of receiving initial impact; and
   a time interval adjusting section which adjusts a time interval at which the head unload control section detects drop or initial impact,
   wherein the time interval adjusting section adjusts the time interval so that the time interval becomes shorter based on the time at which the head unload control section first detects drop or impact, and
   wherein the head unload control section determines whether drop or impact is detected at every time interval, and when the head unload control section detects drop or impact, it adds a predetermined value to a count, and when the head unload control section does not detect drop or the impact, it subtracts a predetermined value from the count so as to unload the head to the unload position based on the count.

3. A storage apparatus which controls movement of a head based on a signal output from an acceleration sensor, comprising:
   a threshold information storage section which stores a first threshold representing signal output from the acceleration sensor that indicates a drop and a second threshold representing a signal output from the acceleration sensor that indicates receiving impact as threshold information;
   a head control section which unloads the head to an unload position based on time starting when drop or impact is first detected based on the signal output from the acceleration sensor and the threshold information,
   wherein the head control section includes:
      a determining section which determines whether the strength of the signal is not less than the second threshold for not less than a predetermined period; and
      a head unload section which unloads the head to the unload position based on time starting from a time point at which the strength of the signal is first not less than the second threshold based on the determination result of the determining section and drop detection time, and
   a threshold adjusting section which, when the determining section determines that the strength of the signal is not less than the second threshold for not less than a predetermined period, adds a predetermined value to the second threshold, and when the head unload section unloads the head, subtracts a predetermined value from the second threshold.

4. A storage apparatus which controls movement of a head based on a signal output from an acceleration sensor, comprising:
- a threshold information storage section which stores a first threshold representing signal output from the acceleration sensor that indicates a drop and a second threshold representing a signal output from the acceleration sensor that indicates receiving impact as threshold information;
- a head control section which unloads the head to an unload position based on time starting when drop or impact is first detected based on the signal output from the acceleration sensor and the threshold information; and
- a time interval adjusting section which adjusts a time interval at which the head control section detects drop or impact,
- wherein the time interval adjusting section adjusts the time interval so that the time interval is reduced based on the time starting from the time point at which the head control section first detects drop or impact, and
- wherein the head control section determines whether drop or impact is detected at every time interval, and when drop or impact is detected, adds a predetermined value to a count, and when drop or impact is not detected, subtracts a predetermined value from the count so as to unload the head to the unload position based on the count.

5. An unload control method for controlling movement of a head mounted to a storage apparatus based on a signal output from an acceleration sensor, comprising:
- an acquiring step of acquiring threshold information including a first threshold representing strength of a signal output from the acceleration sensor that indicates a drop and a second threshold representing strength of a signal output from the acceleration sensor at the time of receiving an initial impact;
- a head control step of unloading the head to an unload position based on time starting from a time point at which drop or initial impact is first detected based on the signal output from the acceleration sensor and the threshold information,
- wherein the head control step includes:
  - a determining step of determining whether the strength of the signal is not less than the second threshold for not less than a predetermined period; and
  - a head unloading step of unloading the head to the unload position based on when the strength of the signal is first not less than the second threshold based on the determination result at the determining step and drop detection time, and
- a threshold adjusting step of, when the determination is made that the strength of the signal is not less than the second threshold for not less than a predetermined period at the determining step, adding a predetermined value to the second threshold, and when the head unload section unloads the head, subtracting a predetermined value from the second threshold.

6. An unload control method for controlling movement of a head mounted to a storage apparatus based on a signal output from an acceleration sensor, comprising:
- an acquiring step of acquiring threshold information including a first threshold representing strength of a signal output from the acceleration sensor that indicates a drop and a second threshold representing strength of a signal output from the acceleration sensor at the time of receiving an initial impact;
- a head control step of unloading the head to an unload position based on time starting from a time point at which drop or initial impact is first detected based on the signal output from the acceleration sensor and the threshold information; and
- a time interval adjusting step of adjusting a time interval at which drop or initial impact is detected at the head control step,
- wherein at the time interval adjusting step, the time interval is adjusted to become shorter based on the time at which drop or initial impact is first detected at the head control step, and
- wherein at the head control step, a determination is made whether drop or initial impact is detected at every time interval, and when drop or initial impact is detected, a predetermined value is added to a count, and when drop or initial impact is not detected, a predetermined value is subtracted from the count so that the head is unloaded to the unload position based on the count.

* * * * *